US005470903A

United States Patent [19]
Lenney et al.

[11] Patent Number: 5,470,903
[45] Date of Patent: * Nov. 28, 1995

[54] N-VINYLAMIDE POLYMERS AS STABILIZING PROTECTIVE COLLOIDS IN AQUEOUS EMULSION POLYMERIZATION

[75] Inventors: William E. Lenney, Allentown; Dennis Sagl, Bethlehem, both of Pa.

[73] Assignee: Air Products and Chemicals, Inc., Allentown, Pa.

[*] Notice: The portion of the term of this patent subsequent to Jul. 5, 2011, has been disclaimed.

[21] Appl. No.: 277,827

[22] Filed: Jul. 20, 1994

[51] Int. Cl.$^6$ ............................. C08F 2/30; C08L 39/02
[52] U.S. Cl. ..................... 524/458; 526/201; 524/459; 524/555
[58] Field of Search ...................... 524/458, 459, 524/555; 526/201

[56] References Cited

U.S. PATENT DOCUMENTS

| 5,011,883 | 4/1991 | Aksman | 524/513 |
| 5,326,809 | 7/1994 | Bott et al. | 524/459 |

FOREIGN PATENT DOCUMENTS

| 0489524A1 | 11/1991 | European Pat. Off. |
| 0160941 | 10/1982 | Japan . |

*Primary Examiner*—Peter A. Szekely
*Attorney, Agent, or Firm*—Russell L. Brewer; Mary E. Bongiorno

[57] ABSTRACT

A method for preparing aqueous polymer emulsions by effecting polymerization of vinyl monomers in the presence of a stabilizing amount of a water soluble poly(N-vinylformamide) containing polymer as a protective colloid and aqueous polymer emulsions containing poly(N-vinylformamide) stablizer.

13 Claims, No Drawings

N-VINYLAMIDE POLYMERS AS STABILIZING PROTECTIVE COLLOIDS IN AQUEOUS EMULSION POLYMERIZATION

FIELD OF THE INVENTION

The present invention relates to the use of poly(N-vinylamide)-containing polymers as protective colloids in the preparation of polymers by aqueous emulsion polymerization techniques.

BACKGROUND OF THE INVENTION

Emulsion polymerization of ethylenically unsaturated monomers in the presence of surface active agents is well known.

A deficiency in the industry has been the inability to balance tile necessary hydrophilicity for effecting emulsion polymerization of the monomers without sacrificing water resistance in the resulting polymer products. Another deficiency is that it has been difficult and costly to incorporate active functionality into emulsion polymers due to copolymerization considerations as well as a lack of chemical versatility in the available functional monomers.

Normally, aqueous polymer emulsions employ hydrophilic polymers such as poly(vinyl alcohol) [PVOH], poly(ethylene oxide), or poly(vinyl pyrrolidone) (PNVP) or surfactants such as alkylphenol ethoxylates, alkyl sulfonates, or alkyl ammonium salts as stabilizers to allow stable polymerization in an aqueous continuous phase. Due to the hydrophilicity of these materials, emulsion polymers prepared containing these materials remain sensitive to the presence of water even after polymers are cast into a solid film, as would be utilized for adhesives, for example. This water sensitivity leads to limitations in the types of applications where these emulsion polymers can be used. Emulsion polymers exhibiting this water sensitivity cannot typically be used, for example, in outdoor applications where exposure to the elements would cause degradation of polymer performance and ultimately in failure of the polymer product.

Previous solutions to water sensitivity have involved incorporation of functional monomers into the emulsion polymers themselves where they remain until catalyzed or promoted to reaction by some mechanism. Typical monomers of this type are N-methylolacrylamide, hydroxyethyl acrylate, glycidyl (meth)acrylate and similar monomers. Several technical problems limit the utility of these types of monomers in addition to economic considerations. Such hydrophilic monomers are soluble in water and are therefore difficult to incorporate effectively into emulsion polymer compositions. Polymerization of these monomers in the aqueous phase can result in serious difficulty in controlling the viscosity of the dispersion and can lead to inadequate performance as crosslinking agents. Consideration also must be given for the differing reactivities of the monomers in the system. These reactivity considerations can affect the available compositions for the individual monomers in the overall product as well as the distribution of the dissimilar monomers within the polymer molecules.

The following patents describe emulsion polymerization of vinyl acetate, vinyl chloride and vinylidene chloride and their copolymers with ethylene or acrylates.

U.S. Pat. No. 5,011,883 discloses copolymers of vinyl monomers such as vinyl acetate and acrylates incorporating PVOH into the emulsion product. This approach has limitations with respect to the level of vinyl acetate which can be homogeneously incorporated into the emulsion product and with respect to properties such as glass transition temperature (Tg). The latter is due to copolymerization of the vinyl monomer with the acrylic monomers.

EP 0,489,524 describes the preparation of amine containing emulsion products which incorporate amine functionality through the use of ammonium salts of fatty acids which are subsequently decomposed at elevated temperatures to produce acid functionality and ammonia. In that case, the conversion of the ammonium functionality used for stabilization to the thermalized acid form results in the transformation of the compound from the water soluble to a water insoluble species.

SUMMARY OF THE INVENTION

The present invention is directed to an improved method for the aqueous emulsion polymerization of ethylenically unsaturated monomers in the presence of a stabilizing composition. The improvement pertains to the stabilizing system used in the polymerization, the stabilizing system comprising a water soluble polymer containing poly(N-vinylformamide) (PNVF) units as the stabilizing agent. The water soluble poly(N-vinylformamide) may be the sole component(s) comprising the stabilizing composition, or it may be used in combination with other emulsifying agents (surfactants) and protective colloids.

The hydrophilic nature of poly(N-vinylformamide) and its versatile reactivity, particularly if a portion of the formamide group is converted to an amine group, as in poly(vinylamine), allows for latent crosslinking of the resulting emulsion polymers. Thus, advantageous properties and crosslinking behavior are evident when this functionality is incorporated into the emulsion system.

DETAILED DESCRIPTION OF THE INVENTION

The poly(N-vinylformamide) (PNVF) unit containing polymer used as the stabilizing agent is prepared by homopolymerizing N-vinylformamide (NVF) to form a homopolymer or optionally by copolymerizing it with other ethylenically unsaturated monomers to form a water soluble poly(N-vinylformamide)copolymer. The weight average molecular weight (Mw) will typically range from 20,000 to 325,000, while the number average molecular weight (Mn) will typically range from 10,000 to 100,000.

By water soluble, it is meant that at least 5 grams of polymer are soluble in 100 grams of water. For example, a small amount of vinyl acetate can be polymerized with the N-vinylformamide (NVF), and if desired a portion of the vinylacetate and NVF hydrolyzed to the form the resulting poly[(vinylacetate)-poly[(vinyl alcohol)-co-poly(N-vinylformamide)-poly(vinylamine)] [PVAc-PVOH-PNVF-PNVA]. The amine units in the polymer may be present in its salt form, depending upon conditions, e.g., the pH of the emulsion. If vinyl acetate is polymerized with vinylformamide and, optionally, a portion of the vinylacetate hydrolyzed, the resulting copolymer may be represented by the following general formula I:

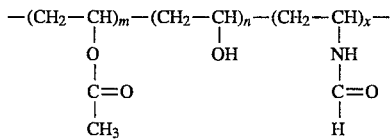

where
m=0–30 mole %
n=0–30 mole %
x=40–100 mole %, preferably 80–100 mole %

Optionally, a portion of the formamide group may be hydrolyzed to the amine and the resulting generic formula is represented by the following:

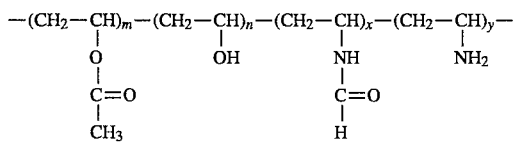

where
m=0–30 mole %,
n=0–30 mole %,
x=40–100 mole %, and
y=0–50% of x.

Preferred values are m is 0–15%, n is 0–15%, x is 70–100% and y is 0–20% of x. Optionally, the amine unit ($NH_2$) may be present as an amine salt ($NH_3^+$).

Other monomers may be polymerized with the N-vinylformamide to form water soluble polymers and these monomers include acrylic, methacrylic and crotonic acid, $C_{1-6}$ alkyl esters of acrylic and methacrylic acid; hydroxyalkylacrylate, e.g., hydroxyethylacrylate and so forth.

The amount of PNVF used in the stabilizing composition for the aqueous emulsion polymerization of monomers is that amount which is sufficient to effect stabilization of the resulting polymer in the continuous aqueous phase. Such amount may suitably range from 0.5 to 20 wt %, based on total monomers, preferably 2 to 8 wt %, and .lost desirably 2 to 5 wt %.

Suitable ethylenically unsaturated polymerizable monomers useful in the preparation of the aqueous polymer emulsions containing thermoplastic polymers according to the invention comprise monoolefinically and polyolefinically unsaturated monomers, including $C_3$–$C_{10}$ alkenoic acids, such as acrylic, methacrylic, crotonic and isocrotonic acids, and their esters with $C_1$–$C_{18}$ alkanols, such as methanol, ethanol, propanol, butanol and 2-ethylhexyl alcohol; α,β-unsaturated $C_4$–$C_{10}$ alkenedioic acids, such as maleic acid, fumaric acid and itaconic acid, and their monoesters and diesters with the same $C_1$–$C_{18}$ alkanols; vinyl halides such as vinyl chloride and vinyl fluoride; vinylidene halides, such as vinylidene chloride; alkenes, such as ethylene, propylene and butadiene; styrene, vinyl toluene and other substituted styrenes; and nitrogen containing monoolefinically unsaturated monomers, particularly nitriles, amides, N-methylolamides, lower alkanoic acid esters of N-methylolamides, lower alkyl ethers of N-methylolamides and allyl carbamates, such as acrylonitrile, acrylamide, methacrylamide, N-methylolacrylamide, N-methylolmethacrylamide, N-methylolallyl carbamate and N-methylol lower alkyl ethers and N-methylol lower alkanoic acid esters of acrylamide, methacrylamide and allyl carbamate; vinyl esters of $C_1$–$C_{18}$ alkanoic acids, such as vinyl formate, vinyl propionate, vinyl laurate and especially vinyl acetate; vinyl ethers, such as methyl vinyl ether and isobutyl vinyl ether; and vinylamides, such as N-vinylpyrrolidone, N-vinylacetamide and allylic amines.

Each of the above monomers may be homopolymerized or copolymerized with at least one other comonomer by aqueous emulsion polymerization techniques well known in the art using the stabilizing composition of the present invention. Such polymerization techniques are described in such chemistry texts as *Polymer Synthesis*, Vol. I and II, by S. R. Sandler and W. Karo, Academic Press, New York and London (1974), and *Preparative Methods of Polymer Chemistry*, Second Edition, by W. R. Sorenson and T. W. Campbell, Interscience Publishers (John Wiley & Sons), New York (1968) as well as numerous patent documents.

Thermoplastic polymers and copolymers can be prepared by any of the known emulsion polymerization processes, such as batch, semi-batch and continuous polymerization processes. The monomers in the aqueous emulsion polymerization recipe can be added all at once or metered into the polymerization reaction medium incrementally or on an intermittent or continuous basis. Preferably a uniform addition rate is used to take advantage of the polymerization reactivities of the various monomers. Aqueous polymer emulsions containing 20 to 65 wt % solids, generally 45–60%, may be obtained.

Catalytically effective amounts of various free-radical forming materials can be used in carrying out the polymerization of the monomers, such as peroxide compounds, like peracetic acid, benzoyl peroxide and t-butyl hydroperoxide, persulfate salts like potassium persulfate and azo compounds like azobisisobutyronitrile. Combination-type systems employing both reducing agents and oxidizing agents can also be used, i.e., a redox system, such as t-butyl hydroperoxide and sodium formaldehyde sulfoxylate.

The oxidizing agent is generally employed in an amount of 0.01 to 1%, preferably 0.05 to 0.5%, based on weight of the monomers introduced into the polymerization system. The reducing agent is ordinarily added in an aqueous solution in the necessary equivalent amount.

With regard to aqueous emulsion polymerization techniques, again any of the well-known emulsifying agents can be used in combination with the poly(N-vinylformamide) stabilizing agent, such emulsifying agents include ionic and nonionic surfactants, such as sodium lauryl sulfate, sodium sulfosuccinate esters and amides, sulfonated alkyl benzenes, alkyl phenoxy poly(ethyleneoxy) ethanols and other poly(ethyleneoxy) condensates. In addition to or in place of the emulsifying agents, protective colloids, such as polyvinyl alcohol and celluloses, like hydroxyethyl cellulose, methyl cellulose, hydroxypropylmethyl cellulose and the like, can be used in combination with the PNVF in the stabilizing composition.

The concentration range of the total amount of stabilizing or emulsifying agents useful is from less than 0.5 to 10% based on total monomers. The poly(N-vinylformamide) should constitute at least 50% of the stabilizing system.

In a preferred embodiment of the invention, vinyl acetate homo- and copolymers and particularly copolymers of vinyl acetate and ethylene [VAE] emulsion can be polymerized in the presence of PNVF. Such VAE copolymers are composed of 60 to 100 wt % vinyl acetate and 0 to 40 wt % ethylene, preferably 70 to 90 wt % vinyl acetate and 5 to 30 wt % ethylene. Other comonomers can also be incorporated into the vinyl acetate polymers such as higher vinyl esters, acrylates, carboxylic acid comonomers N-vinyl formamide, acrylamides and N-methylol acrylamides in amounts ranging from 1 to 10 wt %, preferably 2 to 5 wt %.

Other preferred polymer systems that may be prepared using the PNVF stabilizing agent include vinyl/acrylic copolymers, styrene polymers, styrene/butadiene copolymers, vinyl/acrylic/styrene copolymers, ethylene/vinyl chloride copolymers, vinyl acetate/ethylene/vinyl chloride copolymers and the like.

EXAMPLE 1

PNVF Stabilized Vinylacetate-Ethylene Emulsion

A vinyl acetate-ethylene emulsion was prepared in accordance with general procedures described below. An initial charge having the formulation listed below was charged to a 1 gallon autoclave equipped with a mechanical stirrer, condenser, thermometer and addition ports for nitrogen and delay feeds. The raw materials listed below were used to prepare the initial charge. Monomer and catalyst charges were delayed to the reaction as described.

Raw Materials

D. I. water (distilled water)
Poly(N-vinyl formamide) (Mn≡50,000)
Phosphoric acid
Ferrous ammonium sulfate
Sodium formaldehyde sulfoxylate (NaFS)
Surfactant—Igepal CO-887*
Vinyl acetate
Ethylene
Hydrogen peroxide
t-butyl hydroperoxide
Sodium citrate
Defoamer—colloids 585
Ammonium hydroxide (14%)

* Igepal CO 887 is nonylphenoxypoly(ethyleneoxy) ethanol having an HLB of 17.2 (70% active)

A. Initial Reactor Charge

| | |
|---|---|
| 1. Poly N-vinyl formamide (10% soln.) | 555.0 gms |
| 2. D.I. water | 285.0 gms |
| 3. Igepal CO-887 | 53.0 gms |
| 4. Phosphoric acid (50%) to adjust pH to 3.5 | 0.63 gms |
| 5. Ferrous ammonium sulfate (1% soln.) | 4.8 gms |
| 6. Vinyl acetate | 1852.0 gms |
| 7. Ethylene - quantity to equilibrate reactor to 550 psi at 25° C. | HLB 17.2 |

B. Delay Feeds

1. Hydrogen peroxide, 0.6% aqueous (Redox 1)
2. Hydrogen peroxide, 7.0% aqueous (Redox 1 concentrate)
3. Sodium formaldehyde sulfoxylate, 10% aqueous (Redox 2)

The reactants were charged to the reactor and processed in accordance with the following general procedure.

1. Adjust pH of PNVF solution, surfactant and D.I. water to 3.5 with 50/50 $H_3PO_4$.
2. After pH adjustment, add 4.8 gms of a 1.0% ferrous ammonium sulfate solution.
3. Charge premix formed in Steps 1 and 2 to purged reactor (fill reactor with D.I. water and blow dry with nitrogen).
4. Begin agitation at 200 rpm.
5. Add initial vinyl acetate.
6. Purge at 200 rpm twice with nitrogen, then twice with ethylene, 30 psi subsurfaces purges at 30° C.
7. After 0.5 hours at 200 rpm, increase agitator speed to 900 rpm.
8. Pressurize to 500 psi with $C_2H_4$ (subsurface) over a 20–40 minute period and adjust temperature to 30° C., and allow time for temperature and pressure to equilibrate.
9. Initiate process at 30° C. by adding 0.6% $H_2O_2$ at a rate of 0.4 ml/min. Also start 10% NaFS at 0.5 ml/min.
10. When initiation is observed, switch to 1% $H_2O_2$.
11. Increase process temperature to 60° C. over a 1 hour period. Redox 1 is increased at a rate of 0.4 ml/min. at time (T)=0, then 0.6 ml/min. at T=20 min., and lastly 0.8 ml/min. at T=40 min. to one hour.
12. When the process reaches 60° C.:
    a) Set $C_2H_4$ make-up to 550 psi auto.
    b) Set catalyst to hold a 14° C. delta temperature differential.
    c) Start sampling for pH, free (every hr.).
13. When the free monomer level drops to 3.0% or less:
    a) Increase agitator speed to 1000 rpm.
    b) Stop redox 2 delay when the reaction is complete (68.4 gms added).
    c) Stop dilute catalyst % 1.0 % $H_2O_2$ (Redox 1).
    d) Stop $C_2H_4$ make-up.
    e) Start conc. catalyst 7.0% $H_2O_2$ delay (at 0.5>1.0 ml/min. over 10 minutes).
14. When the 7.0% $H_2O_2$ delay is complete (101.3 gms added), sample and measure free monomer. If the percent free monomer is equal or less than 0.6%, cool batch to 30° C.
15. Adjust pH to 4.5 in reactor with 7.0% $NH_4OH$.
16. When batch temperature reaches 30° C., transfer batch to a kettle (degasser) to effect stripping of volatile gases. During transfer, begin degasser agitator at 200 rpm and add 0.5 gms of defoamer colloids 585.
17. Pull vacuum and break with $N_2$ gas if requested.
18. Prepare post-treatments and add to degasser.
19. Reduce degasser agitation to 100 rpm and hold for 12 hours at low speed to defoam.

The product produced from the above procedure was evaluated and the properties measured. The results are described below.

| Product Properties | | |
|---|---|---|
| Colloidal Properties | | |
| solids % | 59.1 | (64.1) |
| viscosity, 12 rpm | | |
| 20 rpm | 1,858 | (7,530) |
| 60 rpm | | |
| particle size (1) | | |
| DW*, microns | 1.14 | |
| Dn**, microns | 0.50 | |
| Polydispersity | 2.27 | |
| residual Vinylacetate (VAM) | 0.6 | |
| pH | 5.2 | |
| accelerate sedimentation, % | 1.0 | |
| grits, ppm (100 mesh) | 77 | |
| Copolymer Properties | | |

-continued

| Product Properties | |
|---|---|
| Tg, °C. | −5.0 |
| Toluene insolubles, % | 33 |

*Dw refers to particle size weight average.
**Dn refers to particle size number average.

COMPARATIVE EXAMPLE 2

PVOH Stabilized Vinylacetate-Ethylene Emulsion

The general procedure of Example 1 was repeated except that the poly(N-vinylformamide) stabilizer in the initial reactor charge was eliminated and the polyvinyl alcohol substituted to provide the same 3% by weight level based upon the vinyl acetate. Table 1 lists the following comparative properties between Example 1 and this Example.

The product was applied to plasticized polyvinylchloride cloth (PVC cloth) and evaluated for adhesive properties.

TABLE 1

| Adhesive Performance Values | Example 1 | Example 2 |
|---|---|---|
| PVC/cloth peel, lbs/linear inch | 2.876 | 2.276 |
| Creep resistance, mm/min. | 0.262 | 0.115 |
| Speed of set, sec. | 6–9 cl 9* | 6–9 cl 9* |
| Cloth/cloth, lbs/linear inch | | |
| Dry | 12.530 | 12.649 |
| Wet | 2.395 | 3.038 |
| Original Percent Solids | 64.5 | 67.0 |
| pH | 5.5 | 6.0 |
| Viscosity 20 rpm (cps) | 1078 | 912 |

*cl 9 - closer to 9 seconds.

The results show better PVC to cloth peel strengths with the adhesive formulated with surfactant and PNVF as the stabilizer component than the stabilizer consisting of surfactant and polyvinyl alcohol. Creep is somewhat higher but can be overcome with formulation.

STATEMENT OF INDUSTRIAL APPLICATION

The present invention provides aqueous polymer emulsions prepared in the presence of PNVF as a stabilizing protective colloid.

We claim:

1. In a method for preparing an aqueous polymer emulsion containing a thermoplastic polymer therein by the free radical aqueous emulsion polymerization of at least one monomer in the presence of a stabilizing composition, the improvement which comprises using a stabilizing composition comprising from 0.5 to 20% by weight of water soluble polymer containing poly(N-vinylformamide) units.

2. The method of claim 1 wherein at least 40% of the water soluble polymer is comprised of poly(N-vinylformamide) units.

3. The method of claim 1 in which the poly(-N-vinylformamide)polymer contains polymeric units represented by the formula:

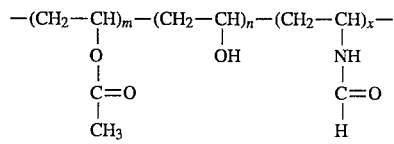

where
m=0–30 mole %
n=0–30 mole %
x=40–100 mole %, preferably 80–100 mole %

4. The method of claim 3 in which the poly(-N-vinylformamide)polymer contains polymeric units of the formula:

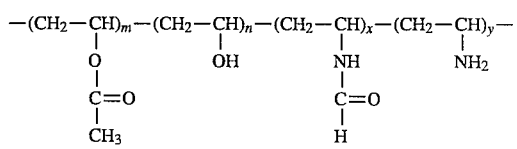

where
m=0–30 mole %,
n=0–30 mole %,
x=40–100 mole
, and
y=0–50% of x.

5. The method of claim 4 in which the poly(-N-vinylformamide)polymer has a weight average molecular weight in the range of 20,000 to 325,000.

6. The method of claim 5 in which the poly(-N-vinylformamide)polymer is present at 0.5 to 10 wt %, based on total monomers.

7. The method of claim 3 in which m ranges from 0 to 15, n ranges from 0 to 15, x ranges from 70 to 100 and y ranges from 0 to 10.

8. The method of claim 7 in which the thermoplastic polymer is a vinyl acetate homo- or copolymer, a vinyl acetate/ethylene copolymer, a (meth)acrylic ester homopolymer, a (meth)acrylic monomer copolymer, a vinyl/acrylic copolymer, a styrene polymer, a styrene/butadiene copolymer, a vinyl/-acrylic/styrene copolymer, an ethylene/vinyl chloride copolymer, or a vinyl acetate/ethylene/vinyl chloride copolymer.

9. In a method for preparing an aqueous polymer emulsion containing a thermoplastic polymer by the free radical aqueous emulsion polymerization of at least one monomer in the presence of a stabilizing composition, the improvement which comprises using a stabilizing composition consisting essentially of 0.5–20 wt %, based on total monomers, of a poly(N-vinylformamide)polymer and, optionally, an emulsifying agent and/or protective colloid, the poly(N-vinylformamide) having the following formula:

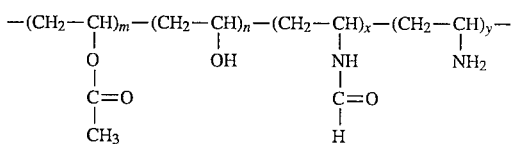

where
m=0–15 mole %,
n=0–15 mole %,
x=70–100 mole %, and y=0–20% of x;
and a weight average molecular weight in the range of 60,000 to 325,000.

10. The method of claim 9 in which the thermoplastic polymer is a vinyl acetate homo- or copolymer, a vinyl acetate/ethylene copolymer, a (meth)acrylic ester homopolymer, a (meth)acrylic monomer copolymer, a vinyl/acrylic copolymer, a styrene polymer, a styrene/butadiene copolymer, a vinyl/-acrylic/styrene copolymer, an ethylene/vinyl chloride copolymer, or a vinyl acetate/ethylene/vinyl chloride copolymer.

11. The method of claim 10 in which the stablizer containing poly(N-vinylformamide) units is present at 2–8 wt %, based on total monomers to be polymerized.

12. The method of claim 11 in which y is a positive number and the amine is present as a salt.

13. In an aqueous polymer emulsion, the improvement which comprises the polymer emulsion of claim 9.

* * * * *